June 16, 1959     E. L. EGBERT     2,890,661
HYDRAULIC COUPLING
Filed Sept. 12, 1955     2 Sheets-Sheet 1
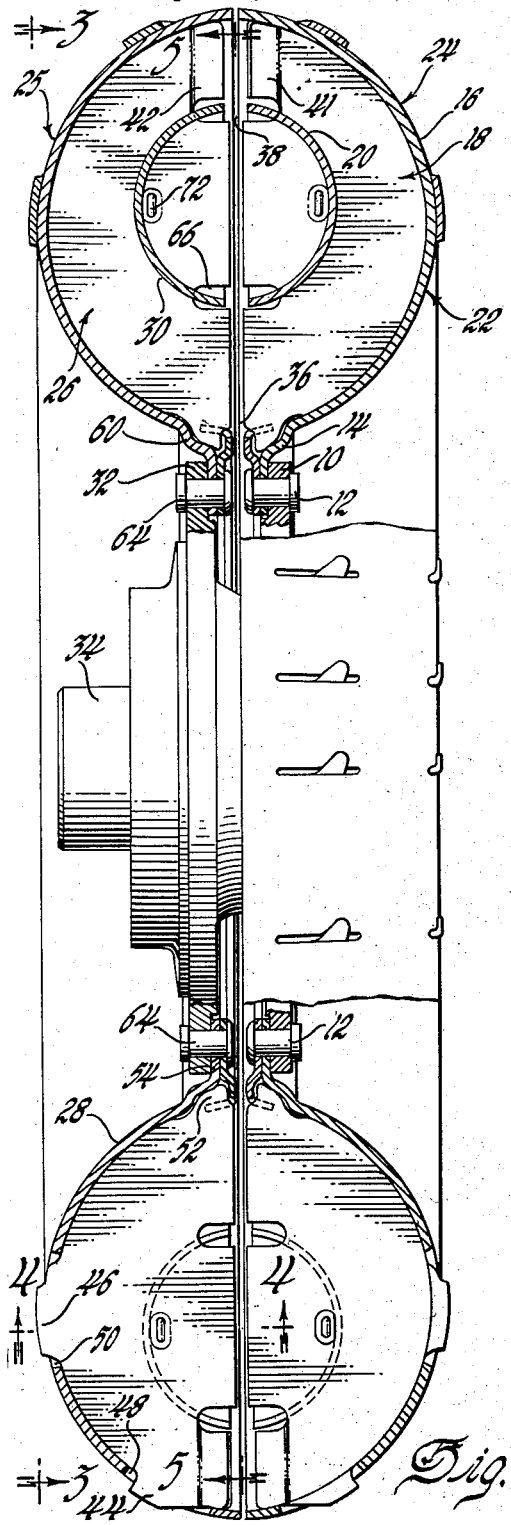
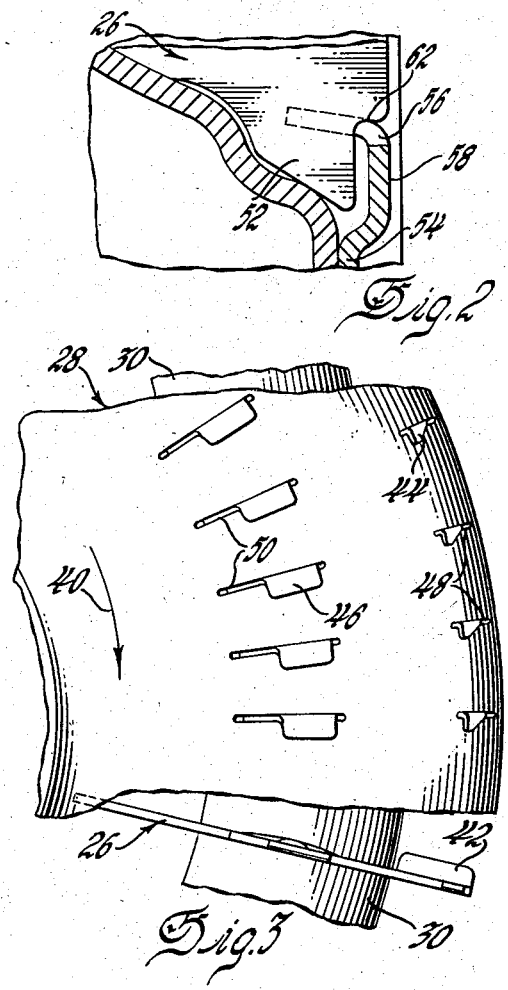
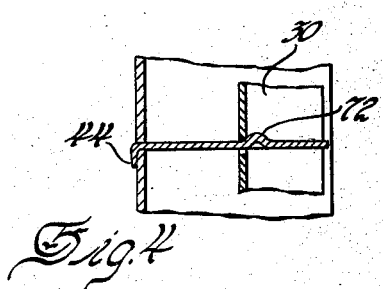
INVENTOR.
Earl L. Egbert
BY W. C. Middleton
ATTORNEY June 16, 1959 E. L. EGBERT 2,890,661
HYDRAULIC COUPLING
Filed Sept. 12, 1955 2 Sheets-Sheet 2
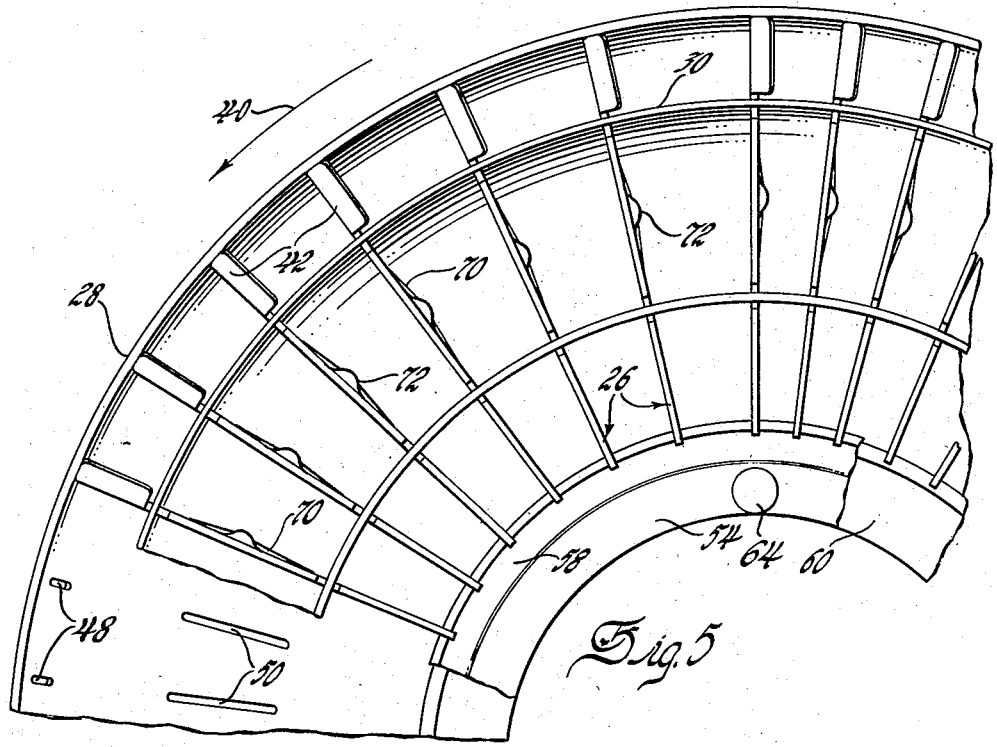
Fig. 5
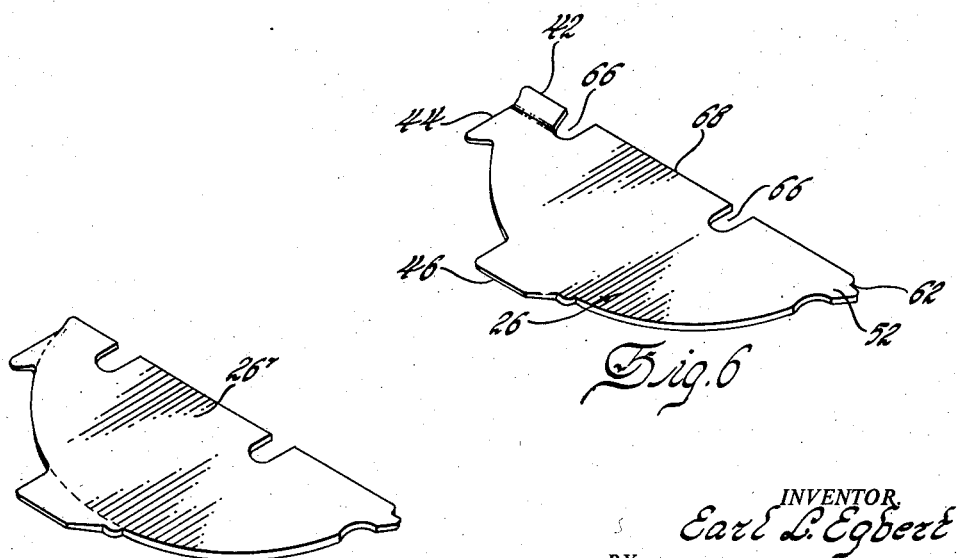
Fig. 6
Fig. 7
INVENTOR.
Earl L. Egbert
BY
W. C. Middleton
ATTORNEY

United States Patent Office 2,890,661
Patented June 16, 1959

2,890,661

HYDRAULIC COUPLING

Earl L. Egbert, Detroit, Mich., assignor to General Motors Corporation, Detroit, Mich., a corporation of Delaware Application September 12, 1955, Serial No. 533,741

1 Claim. (Cl. 103—115)

This invention relates to a hydraulic coupling, the details of construction and method of assemblying the coupling parts.

An object of this invention is to provide a hydraulic coupling that is capable of being assembled with a minimum number of operations and without necessitating the use of welding or brazing operations.

Another object of this invention is to provide a hydraulic coupling having a plurality of stamped sheet metal parts that can be assembled quickly and in a highly efficient manner.

A still further object of the invention is to provide a hydraulic coupling with two fluid circuits to increase the torque transmission capacity of the coupling.

Other features, advantages, and objects will become apparent by reference to the detailed description of the invention and to the drawings wherein;

Figure 1 shows a cross-sectional view of a fluid coupling illustrating an embodiment of the present invention, Figure 2 is an enlarged partial view of the hub anchoring the turbine blade tab to the turbine shroud member, Figure 3 is a partial view illustrating the method of anchoring the blade tabs to the shroud member as viewed in the direction of the arrows 3—3 in Figure 1, Figure 4 is a partial view illustrating the method of anchoring the inner shroud ring to the blade members as viewed in the direction of the arrows 4—4 in Figure 1, Figure 5 is a partial cross-sectional view of the turbine element as viewed in the direction of the arrows 5—5 of Figure 1, Figure 6 is a separate view of the turbine blade member, and Figure 7 is a modification of Figure 6.

Referring to the drawings and more particularly to Figure 1, 10 indicates a driving member member adapted to be driven by any suitable means (not shown). Connected to driving member 10 by rivets 12 for rotation therewith is the hub portion 14 of an outer pump shroud ring or shell 16. Attached to the shroud by means to be hereinafter described are a plurality of semi-elliptical bladed or vaned elements 18 unequally spaced around the periphery of the shroud member. Connecting the blades together adjacent their inner edges is an inner shroud ring or member 20, which together with the blades and outer shroud constitute the pump member 22 of a hydraulic or fluid coupling 24. Facing said pump blade members 18 for cooperation therewith are a plurality of similarly shaped semi-elliptical turbine blade members 26 attached to and connected together by an outer shroud 28. These blades, which are unequally spaced around the periphery of the outer shroud member, are connected adjacent their inner edges by an inner dish-shaped shroud 30 cooperating with shroud 20 to define a fluid flow path within the area bounded by both of the inner shroud rings or members. Both the pump and the turbine each have a portion of the blades within the area bounded by the inner shroud rings 20 and 30 to increase the capacity of the coupling by providing more torque transmission from pump 22 to turbine 25. The area between the outer and inner shrouds of the pump and turbine members defines the main fluid flow path or path of circulation of the fluid, which will be in a counterclockwise direction as viewed in Figure 1. Connected to the turbine outer shroud 28 for rotation therewith is an outer peripheral portion 32 of a driven member 34.

Referring now to Figures 1, 6 and 7, it will be noted that the outermost radial portion 41 of the pump blade or vane 18, which is the exit portion of the pump as far as fluid circulation is concerned, is bent at an angle of approximately 30° in a forward direction relative to the direction of rotation of the pump element, which is designated by the arrow 40 in Figures 3 and 5 (pump and turbine elements rotate in the same direction). This bending of the vane at this portion has the effect of increasing the efficiency of torque transmission from the pump to the turbine element. The turbine vane element 26 also has its outermost radial portion 42, which is the fluid entrance portion, curved or bent, as seen in Figure 6. However, the turbine vane portion 42 is bent in a backward direction at an angle of approximately 30° in relation to the direction of rotation of the turbine to provide an entrance of the fluid to the turbine with the most efficient flow pattern and the minimum amount of turbulence. It will be obvious, however, that the outer portions of both of the vanes may be straight as indicated by the modification of the turbine blade 26' in Figure 7, or that either outer vaned portion may be bent with the other vane straight (not shown) without varying the scope of the invention.

The actual operation of the device is as follows. The coupling 24 is adapted to be filled with fluid at all times by any suitable means (not shown), and may be filled at the hub in the space 36 between the turbine and pump blades, with the fluid discharge being at 38. Upon rotation of driving member 10, pump 22 will rotate, causing the fluid to circulate from the pump to turbine member 25 in both the main and secondary paths of circulation, effecting a rotation of the turbine, thereby driving driven shaft 34 at a speed varying progressively from zero to substantially a 1 to 1 ratio, depending upon the amount of slip present in the coupling. This basic operation is well known in the art of fluid couplings.

The method of assemblying the fluid coupling will now be described. Since both the pump and turbine members are assembled in the same manner, it is deemed sufficient at the present time to describe only the assembly of one; namely, the turbine member. As seen in Figure 6, each blade member 26 has a plurality of tabs 44 and 46 formed thereon adapted to be inserted in slots or apertures 48 and 50, respectively, provided in the outer turbine shroud member 28 to anchor the blades to the shroud. After insertion of the tabs in the respective slots, all of the tabs are bent or rolled over flat in the same direction against the shroud member as seen in Figure 3. In addition to tabs 44 and 46 on turbine blade 26, a tab 52 is provided for anchoring the innermost radial portion of the blade. After tabs 44 and 46 are bent over on the shroud member, an annular hub member 54 having a plurality of slots 56 in a channel-shaped portion 58 further anchors the blades to the shroud by being positioned over the innermost radial portion of the turbine shroud 28 so that tabs 52 of the blades will project into slots 56. The number and spacing of slots 56 in hub 54 corresponds to the number and spacing of blades 26. An offset shoulder 62 is provided on the vane or blade to cooperate with the top of slot 56 in hub 54. Hub 54 may be rigidly connected to shroud 60 and driven portion 32 by any suitable means, such as rivets 64 shown in Figure 1.

The last element to be added in assembling the turbine member is the inner shroud 30. Blade members 26 are further provided with a plurality of slots 66 defining the secondary turbine blade elements 68 adapted to project through slots 70 in the annular dish-shaped shroud 30. Slots 70 are shown as having a somewhat triangular shape for ease of manufacture and assembly. The inner shroud ring is placed over blades 26 so that blade portions 68 project through slots 70 to such an extent that the edges of the shroud nearest to the adjacent pump inner shroud edges are flush with the inner straight radial edge of the blade. The inner shroud is then anchored in position by embossing or crimping the blade by any suitable means (not shown) as seen in Figure 4 at 72. Each blade is embossed or crimped in the same direction at the median point of the slot 70 so as to have a portion of the vane overlapping a section of the inner shroud to wedge the shroud between the end of the slot and the embossed portion in a non-movable position with relation to the vane.

From the foregoing it will be seen that applicant has provided a fluid coupling capable of being assembled in a highly efficient manner and without necessitating the use of welding or brazing operations. It will be understood that the invention can be modified beyond the illustrated embodiments, and, therefore, any limitations to be imposed are those set forth in the following claim.

I claim:

A hydrodynamic drive device having a plurality of blade members, each of said blade members being divided into two portions, one of said portions having a plurality of tabs extending outwardly therefrom from the outer edge of each blade and the other of said portions being defined by a pair of slots extending inwardly from the inner edge of each blade, an outer shroud member of toroidal shape provided with a plurality of slots cooperating with said tabs and securing said blade members in spaced relationship, and an inner shroud member of toroidal shape provided with a plurality of slots through which said other of said portions extend, the inner terminal ends of the slots in said blade members providing first spaced shoulders in each of said blade members, and the terminal ends of the slots in said inner shroud member providing a plurality of second spaced shoulders in said inner shroud member, said first spaced shoulders in said blade members abutting corresponding second spaced shoulders in said inner shroud member, each of said blade members having a single embossment engaging the inner surface of said inner shroud member and forcing said first spaced shoulders against said second spaced shoulders to provide the sole anchoring means for securing said inner shroud member to said blade members.

References Cited in the file of this patent

UNITED STATES PATENTS

| | | |
|---|---|---|
| 2,357,295 | Thompson | Sept. 5, 1944 |
| 2,652,782 | Herndon et al. | Sept. 22, 1953 |
| 2,745,354 | English et al. | May 15, 1956 |

FOREIGN PATENTS

| | | |
|---|---|---|
| 74,231 | Norway | Nov. 8, 1948 |
| 407,633 | Great Britain | Mar. 22, 1934 |
| 623,149 | Great Britain | May 12, 1957 |
| 972,802 | France | Sept. 6, 1950 |